United States Patent
Nakamura

(10) Patent No.: US 6,212,328 B1
(45) Date of Patent: Apr. 3, 2001

(54) PROGRAM RECORDING APPARATUS AND METHOD

(75) Inventor: Hitoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/220,294

(22) Filed: Dec. 23, 1998

Related U.S. Application Data

(63) Continuation of application No. PCT/JP98/01910, filed on Apr. 24, 1998.

(30) Foreign Application Priority Data

Apr. 28, 1997 (JP) .................................... 9-110828

(51) Int. Cl.$^7$ .................... H04N 5/761; H04N 5/7613
(52) U.S. Cl. ................................... 386/83; 386/46
(58) Field of Search ................... 386/46, 94, 95, 386/56, 83, 92, 52, 1, 4, 96; 360/60, 15; 380/4, 5, 20; H04N 5/761, 5/7613

(56) References Cited

U.S. PATENT DOCUMENTS 4,879,611 * 11/1989 Fukui et al. .................... 386/83
5,907,443 * 5/1999 Hirata ........................... 360/60
5,933,569 * 8/1999 Sawabe et al. .................. 386/94

OTHER PUBLICATIONS

JP, 9–83927, A (Matsushita Electric Industrial Co., Ltd.), Mar. 28, 1997.

JP, 8–18900, A (Hitachi, Ltd.), Jan. 19, 1996.

* cited by examiner

Primary Examiner—Robert Chevalier
(74) Attorney, Agent, or Firm—Frommer Lawrence & Haug, LLP.; William S. Frommer

(57) ABSTRACT

A video signal and an audio signal of a program which is received are always recorded to a hard disk. When a command for program preservation is given, the rewriting of the recorded area in the hard disk is inhibited and the program can be preserved to the hard disk in a range which does not exceed a predetermined time while tracing back to the past. The program is recorded to the hard disk until the end time of the program. Further, in addition to the recording of the program, a recording reservation of the program can be automatically set.

8 Claims, 6 Drawing Sheets

PROGRAM RECORDING APPARATUS AND METHOD

This is a continuation of copending International Application PCT/JP98/01910 having an international filing date of Apr. 24, 1998.

TECHNICAL FIELD

The invention relates to program recording apparatus and method which are suitable for use in a television receiver such that a program is always recorded to a recording medium.

BACKGROUND ART

There are many cases where a telephone call suddenly rings or someone suddenly comes while the user is enjoying a television broadcasting, so that he overlooks a broadcasting program. If the user overlooked a television broadcasting program, this program can never be seen except for a program that is rebroadcasted. It is a rare case that the program is rebroadcasted in a short period of time. A news program and a sports program are not rebroadcasted in most cases. In many cases, therefore, if the user overlooked a television broadcasting program, this program cannot be seen forever.

There is a case where a scene such as good scene of a movie or a drama, interview of an important person, highlight scene of a sports program, or the like which the user wants to preserve suddenly starts during the watching of a broadcasting program. In such a case, a situation such that even if the user immediately sets a VTR, he misses such a scene and he cannot record the scene often occurs.

Therefore, a television receiver such that while the user is watching a broadcasting program, such a program is always recorded on a recording medium is considered. In such a television receiver, even if there is a sudden telephone call or someone suddenly comes, such a program can be traced back and reproduced and he does not overlook the program. Such a program can be easily preserved and even if a program which the user wants to record suddenly starts, it is possible to cope with it.

As a recording medium in the television receiver such that a program is always recorded onto a recording medium as mentioned above, a hard disk drive can be used. Hitherto, as a recording medium for recording a video signal, a magnetic tape is widely used. However, an accessing speed of the magnetic tape is slow and it is difficult to use it as a recording medium that is used in such a television receiver. Although the use of a semiconductor memory is considered, the semiconductor memory of a large capacity is very expensive. In the semiconductor memory, if a power source is turned off, the preserved program is erased, so that it is inconvenient in case of preserving a program for a long time. On the other hand, in the hard disk drive, a capacity is large and an accessing speed is also high enough.

As mentioned above, in the television receiver having the hard disk drive, the program which is being received is always recorded and this program can be easily preserved. In such a television receiver having the hard disk drive, it is further demanded that a desired program can be easily and certainly recorded from the start to the end.

That is, hitherto, as a recording apparatus of a video signal, a VTR for recording the video signal to a tape has been widespread. In the VTR, when a record key is pressed during the reception of the program, the program which is being received is recorded as it is. Therefore, in a case such that a desired program is preserved by the VTR, the record key has to be pressed at the start of the program and a stop key has to be pressed at the end of the program. However, unless attention is paid, the start time of the program is missed and the program cannot be recorded from the start thereof. As mentioned above, in the conventional VTR, when a desired program has started, it is difficult to record the desired program in a range from the start of the program to the end.

Although the timer reserving function is provided for the VTR, the operation for the timer reservation is complicated and the operation to set the recording start time and the recording end time is very troublesome.

DISCLOSURE OF INVENTION

It is, therefore, an object of the invention to provide program recording apparatus and method which can easily and certainly record a desired program from the start to the end.

To accomplish the above object, according to the invention, there is provided a program recording apparatus having a recording medium for always recording a video signal and an audio signal of a program which is received,
 characterized in that by inhibiting a rewriting of a recorded area of the recording medium, the program is preserved to the recording medium while tracing back to the past within a range which does not exceed a predetermined time.

According to the invention, there is provided a program recording apparatus having a recording medium for always recording a video signal and an audio signal of a program which is received,
 characterized in that the apparatus has means for providing a command to preserve the program, and
 by inhibiting a rewriting of a recorded area of the recording medium, the program is preserved to the recording medium while tracing back to the past within a range which does not exceed a predetermined time from the time when the command is given.

According to the invention, there is further provided a program recording method using a recording medium for always recording a video signal and an audio signal of a program which is received,
 characterized in that by inhibiting a rewriting of a recorded area of the recording medium, the program is preserved to the recording medium while tracing back the past within a range which does not exceed a predetermined time.

According to the invention, there is further provided a program recording method using a recording medium for always recording a video signal and an audio signal of a program which is received,
 characterized in that a command to preserve the program is provided, and
 by inhibiting a rewriting of a recorded area of the recording medium within a range which does not exceed a predetermined time from the time when the command is provided, the program is preserved to the recording medium while tracing back to the past.

In many cases, the television broadcasting program is broadcasted on a unit basis of 30 minutes or one hour from the beginning of the hour. Therefore, the program can be managed by using 30 minutes or 1 hour as a unit. According to the invention, the start time and the end time of the program are set on the assumption that when a signal indicative of the recording start of the program is inputted, the program is broadcasted on a unit basis of 30 minutes or 1 hour from the start of the hour. The received broadcasting is recorded for a period of time from the start time to end time of the program which were set as mentioned above.

BEST MODE FOR CARRYING OUT THE INVENTION

An embodiment of the invention will now be described hereinbelow with reference to the drawings. The invention is applied to a television receiver such that a hard disk drive is built in a television receiver. In such a television receiver having the hard disk drive, it is possible to reproduce an overlooked scene or a scene which the user wants to again watch while tracing back to the past them or to record and reproduce a desired program.

Figure 1:
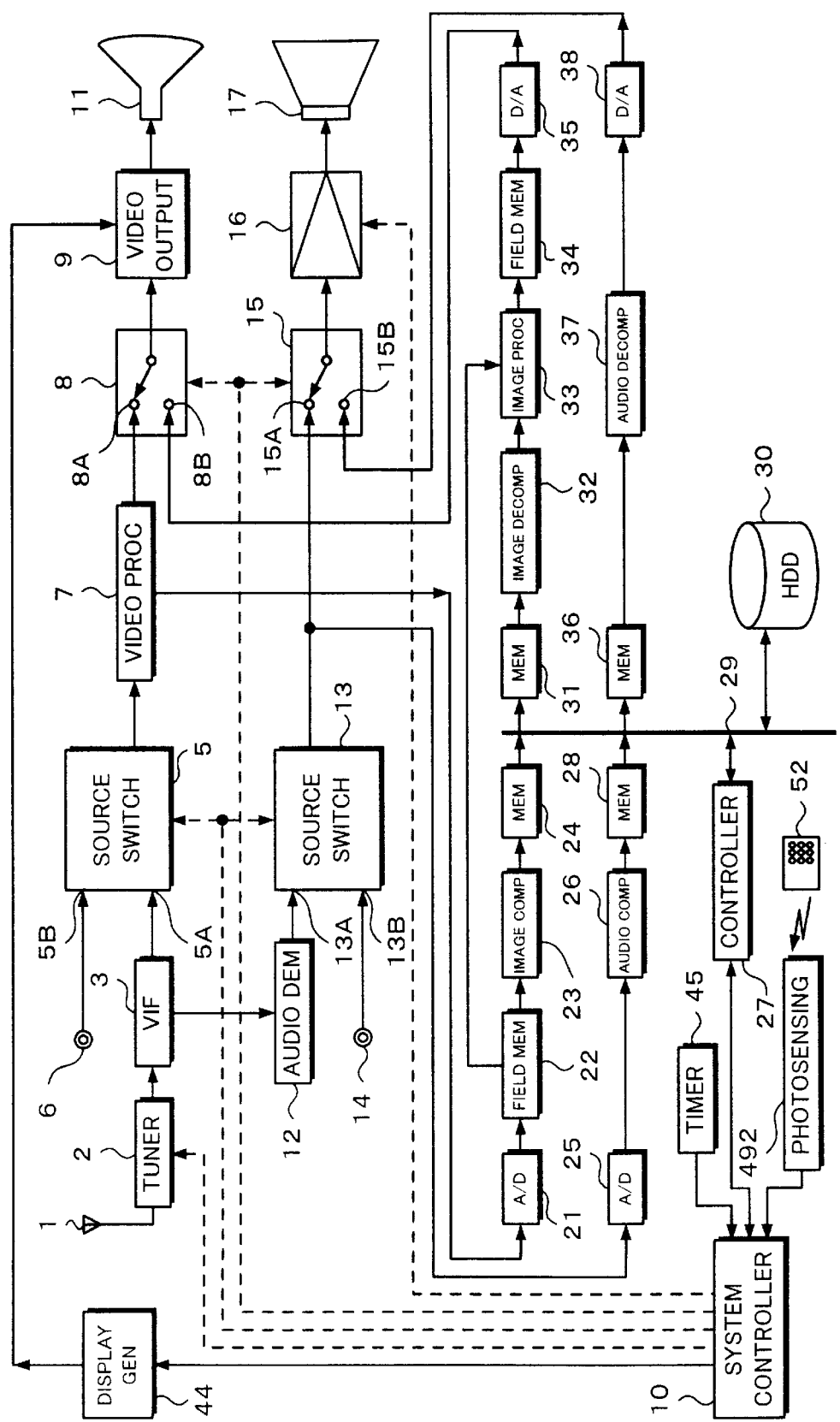
FIG. 1 is a block diagram showing an example of a television receiver to which the invention is applied.

FIG. 1 shows a construction of a television receiver to which the invention is applied. In FIG. 1, a reception signal received by an antenna 1 is supplied to a tuner circuit 2. In the tuner circuit 2, a channel setting signal is supplied from a system controller 10. In the tuner circuit 2, a signal of a desired reception channel is selected on the basis of the channel setting signal and this signal is converted into an intermediate frequency signal.

An output of the tuner circuit 2 is supplied to a video intermediate frequency circuit 3. In the video intermediate frequency circuit 3, the intermediate frequency signal from the tuner circuit 2 is amplified and this signal is video detected. Thus, for example, a composite video signal of the NTSC system is obtained. The video signal is supplied to one input terminal 5A of a video source change-over switch 5. The audio signal is detected from a beat component of, for instance, 4.5 MHz in an output of the video intermediate frequency circuit 3. This output is supplied to an audio demodulating circuit 12.

A video signal from an external video input terminal 6 is supplied to another input terminal 5B of the video source change-over switch 5. A selection signal is supplied from the system controller 10 to the video source change-over switch 5. The video signal based on the received television broadcasting and the video signal from the external video input terminal 6 are switched by the video source change-over switch 5.

An output of the video source change-over switch 5 is supplied to a video signal processing circuit 7. By the video signal processing circuit 7, a luminance signal Y and a chroma signal C are separated from a composite video signal of the NTSC system. Further, color difference signals U and V are demodulated from the chroma signal C. Component video signals Y, U, and V are formed. The component video signals Y, U, and V are supplied to a terminal 8A of a switching circuit 8 and are also supplied to an A/D converter 21 in order to preserve the video signal to the hard disk drive 30. An output of a D/A converter 35 is supplied to another input terminal 8B of the switching circuit 8 in order to output the reproduction picture plane from the hard disk drive 30.

The switching circuit 8 is used to switch a picture plane based on received television broadcasting or the video signal from the external video input terminal 6 and a reproduction picture plane from a hard disk drive 30. The switching circuit 8 is controlled by the system controller 10. In case of displaying the picture plane based on the received television broadcasting or the video signal from the external video input terminal 6, the switching circuit 8 is switched to the terminal 8A side. In case of displaying a reproduction picture plane from the hard disk drive 30, the switching circuit 8 is switched to the terminal 8B side.

An output of the switching circuit 8 is supplied to a video output circuit 9. The video output circuit 9 has: a matrix circuit to form three primary color signals R, G, and B from the component video signals Y, U, and V from the switching circuit 8; and a video amplifying circuit to drive the three primary color signals R, G, and B and supply to a color image receiving tube 11. In the video output circuit 9, the component video signals Y, U, and V from the switching circuit 8 are converted to the three primary color signals R, G, and B and are supplied to the color image receiving tube 11.

The audio signal detected from the beat component of, for example, 4.5 MHz of the output of the video intermediate frequency circuit 3 is supplied to the audio demodulating circuit 12. The audio signal is demodulated by the audio demodulating circuit 12. The audio signal is supplied to an input terminal 13A of an audio source change-over switch 13.

An audio signal from an external audio input terminal 14 is supplied to another terminal 13B of the audio source change-over switch 13. The audio signal based on the received television broadcasting and the audio signal from the external audio input terminal 14 are selected by the audio source change-over switch 13.

An output of the audio source change-over switch 13 is supplied to a terminal 15A of a switching circuit 15 and is supplied to an A/D converter 25 in order to preserve the audio signal to the hard disk drive 30. An output of a D/A converter 38 is supplied to another input terminal 15B of the switching circuit 15 in order to output the audio signal from the hard disk drive 30.

The switching circuit 15 switches an audio signal from the received television broadcasting or the external audio input terminal 14 and an audio signal reproduced from the hard disk drive 30. The switching circuit 15 is controlled by the system controller 10. In case of outputting the audio signal from the received television broadcasting or the external audio input terminal 14, the switching circuit 15 is switched to the terminal 15A side. In case of outputting the audio signal from the hard disk drive 30, the switching circuit 15 is switched to the terminal 15B side.

The output of the switching circuit 15 is supplied to an audio amplifier 16. The audio signal from the switching circuit 15 is amplified by the audio amplifier 16. The audio signal is supplied to a speaker 17.

The component video signals Y, U, and V from the video signal processing circuit 7 are supplied to the A/D converter 21 in order to preserve in the hard disk drive 30. In the A/D converter 21, the component video signals from the video signal processing circuit 7 are converted to digital signals. An output of the A/D converter 21 is supplied to a field memory 22. An output of the field memory 22 is supplied to an image compressing circuit 23. In the image compressing circuit 23, the component video signal is compressed. As a compression system of the image, for example, a motion JPEG is used and the image is compressed so as to equalize a code amount of one field. The video data compressed by the image compressing circuit 23 is sent to a bus 29 through a buffer memory 24.

The audio signal from the audio source change-over switch 13 is supplied to the A/D converter 25 in order to preserve in the hard disk drive 30. In the A/D converter 25, the audio signal from the audio source change-over switch 13 is converted to the digital signal. An output of the A/D converter 25 is supplied to an audio compressing circuit 26. In the audio compressing circuit 26, the audio signal is compressed. As a compression system of audio, for example, a non-linear PCM is used. The audio data compressed in the audio compressing circuit 26 is sent to the bus 29 through a buffer memory 28.

The video data from the buffer memory 24 and the audio data from the buffer memory 28 are synthesized to blocks of a fixed length. A predetermined header to identify the block is provided for each block.

The video data and the audio data which were synthesized into the blocks as mentioned above are recorded to the hard disk drive 30 through the bus 29 on the basis of a control of a recording/reproduction controller 27 comprising a CPU (Central Processing Unit). Thus, the video data and the audio data are stored in the hard disk drive 30.

The video data and the audio data recorded in the hard disk drive 30 are reproduced on the basis of the control of a recording/reproduction controller 27. The reproduction data from the hard disk drive 30 is supplied to buffer memories 31 and 36 through the bus 29.

The video data from the buffer memory 31 is supplied to an image decompressing circuit 32. In the image decompressing circuit 32, the component video data Y, U, and V are formed from the video data compressed by, for example, the motion JPEG. An output of the image decompressing circuit 32 is supplied to the D/A converter 35 through an image processing circuit 33 to form a multiscreen and a field memory 34. The digital video signal is converted to the analog video signal by the D/A converter 35. An output of the D/A converter 35 is supplied to the terminal 8B of the switching circuit 8.

The audio data from the buffer memory 36 is supplied to an audio decompressing circuit 37. An output of the audio decompressing circuit 37 is supplied to the D/A converter 38. The digital audio signal is converted to the analog audio signal by the D/A converter 38. An output of the D/A converter 38 is supplied to the terminal 15B of the switching circuit 15.

The system controller 10 executes the whole control of the television receiver. The system controller 10 and recording/reproduction controller 27 are bidirectionally connected.

An input from a remote commander 52 is supplied to the system controller 10 through a photosensing unit 42. Various operations are set on the basis of the input from the remote commander 52. An output of the system controller 10 is supplied to a display generating circuit 44. Display signals showing various operation setting states are generated from the display generating circuit 44. An output of the display generating circuit 44 is supplied to the video output circuit 9 and various operating states are displayed on the screen. A timer 45 is provided for the system controller 10. The timer 45 is used when the time that is required to preserve the program is set.

Figure 2:
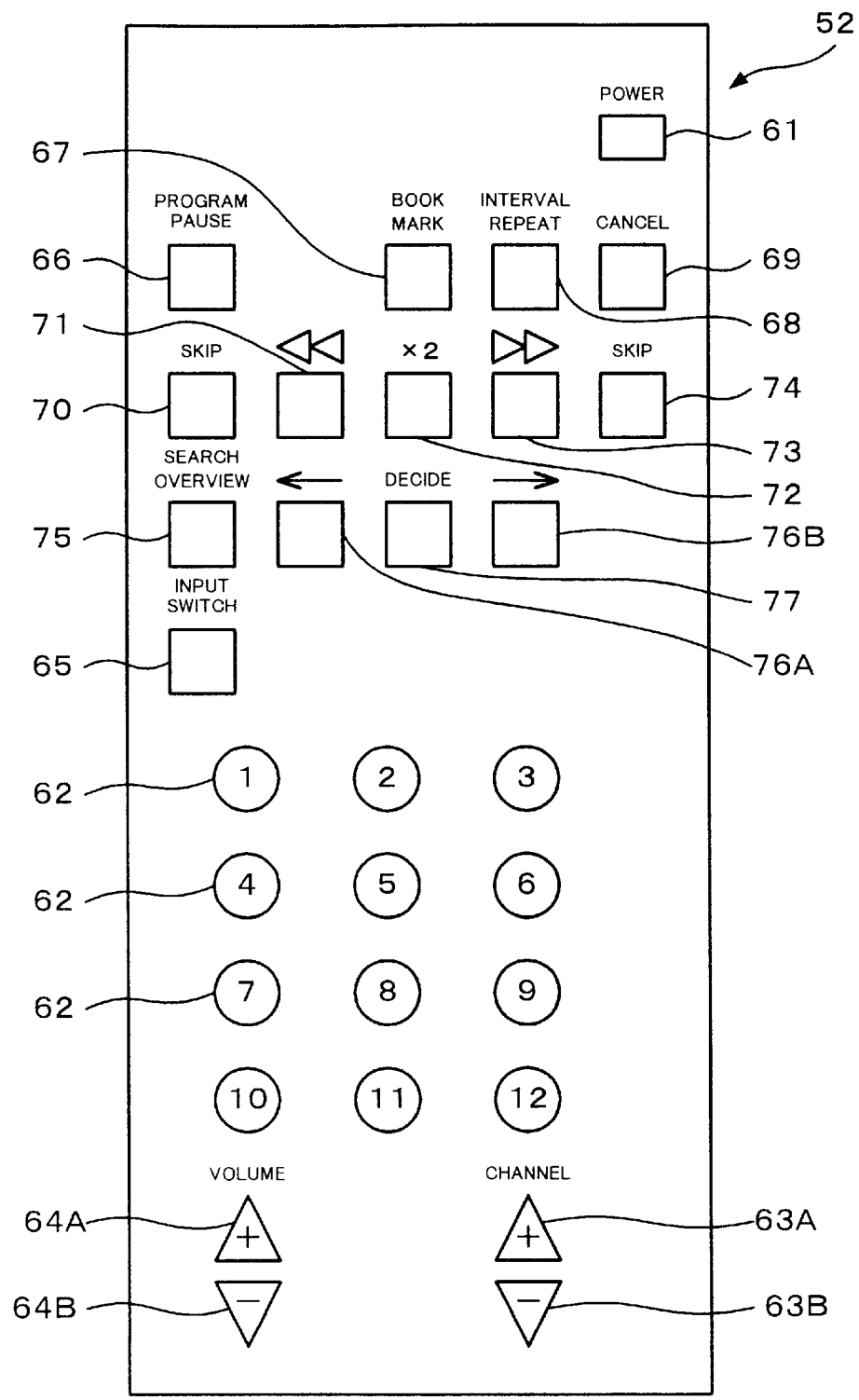
FIG. 2 is a plan view for use in explanation of a remote commander in the television receiver to which the invention is applied.

As shown in FIG. 2, the television receiver to which the invention is applied can be operated by using the remote commander 52.

Various keys to perform the fundamental setting of the television receiver are arranged in the remote commander 52. That is, a power switch 61 to turn on/off a power source of the television receiver, channel keys 62 to set a channel, channel up/down keys 63A and 63B, volume up/down keys 64A and 64B, and an input source change-over switch 65 are arranged.

Further, as various keys to control the recording and reproduction of the hard disk drive 30 of the television receiver, a program pause key 66, a bookmark key 67, an interval repeat key 68, a cancel key 69, a reverse rotation skip play key 70, a reverse rotation high speed feed key 71, a double-speed key 72, a forward rotation high speed feed key 73, a forward rotation skip key 74, an overview search key 75, arrow keys 76A and 76B, and a decide key 77 are arranged in the remote commander 52 to operate the television receiver to which the invention is applied.

When the program pause key 66 is depressed, the picture plane which is being received is stopped at this position and is displayed as a still image. For this period of time, this program is recorded in the hard disk drive 30 of the television receiver. When the program pause key 66 is again depressed, the program recorded in the hard disk drive 30 is reproduced from the scene at the position where the still image is displayed.

When the bookmark key 67 is pressed, the program which is being broadcasted at this time can be preserved in the hard disk drive 30 of the television receiver.

A repeat reproduction is set by the interval repeat key 68. When the interval repeat key 68 is first pressed, the start position of the repetition is set. When the interval repeat key 68 is subsequently pressed, the end position of the repetition is set.

The cancel key 69 is pressed when the set operation or function is cancelled.

The reverse rotation skip play key 70, reverse rotation high speed feed key 71, double-speed key 72, forward rotation high speed feed key 73, and forward rotation skip key 74 are the keys to perform a variable speed reproduction.

The overview search key 75, arrow keys 76A and 76B, and decide key 77 are used to search a program. When the overview search key 75 is pressed, the picture plane of the television receiver is divided into a center picture plane and a plurality of peripheral small picture planes. Among the picture planes recorded in the hard disk drive 30, the picture planes of every predetermined times are displayed in the peripheral small picture planes. By operating the arrow keys 76A and 76B, a desired picture plane is selected from a plurality of picture planes. When the reproduction start position is searched, the decide key 77 is pressed. When the decide key 77 is pressed, the reproduction is started from the selected picture plane.

As mentioned above, the bookmark key 67 is provided for the remote commander 52 of the television receiver to which the invention is applied. When the bookmark key 67 is pressed, the program which is being broadcasted at this time can be recorded to the hard disk drive 30. The recording of the program by the bookmark key 67 will be further described in detail.

In most cases, the existing broadcasting programs of the television are broadcasted on a unit basis of 30 minutes or one hour. For example, broadcasting programs of a television of a certain broadcasting station are as follows.

7:00~7:30: News

7:30~8:00: News commentary

10:00~10:30: News

10:30~11:00: Documentary

12:00~13:00: Drama

Although there are several exceptions, as mentioned above, in many cases, the television broadcasting program starts at X:00 or X:30 and ends at X:30 or X:00 and is broadcasted on a unit basis of 30 minutes or one hour. Therefore, the programs can be managed by setting 30 minutes or one hour to a unit.

The management of the programs by the bookmark key 67 is performed on a unit basis of 30 minutes or one hour. By managing the programs on a unit basis of 30 minutes or one hour as mentioned above, if the bookmark key 67 is pressed at a position of the program which the user wants to preserve, the program can be easily recorded. There is no need to perform an input for starting or finishing the recording.

Figure 3:
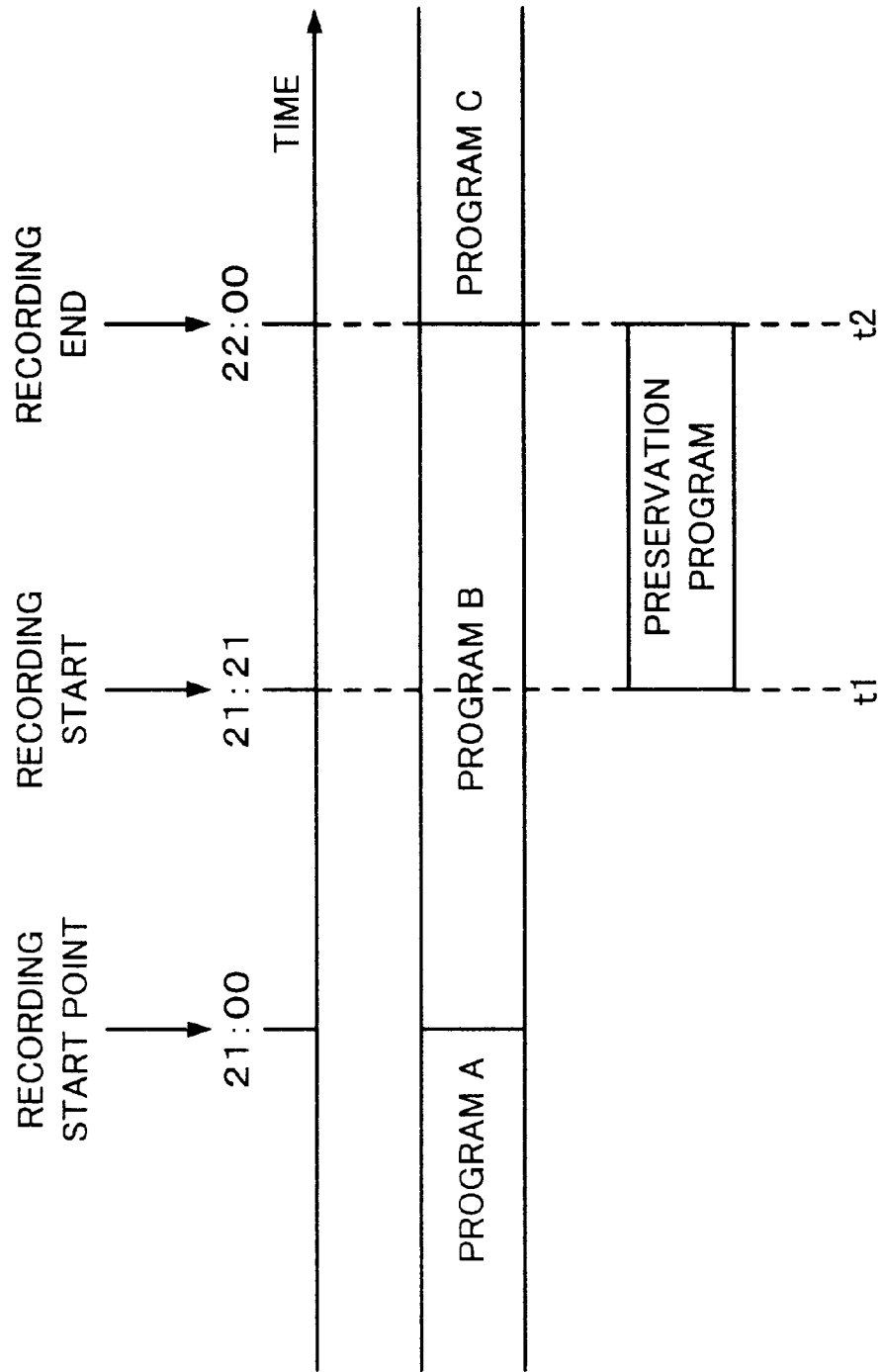
FIG. 3 is a schematic diagram for use in explanation of a program recording.

For example, as shown in FIG. 3, it is now assumed that a "program B" is broadcasted from 21:00 to 22:00 and this "program B" is recorded. In the conventional VTR or the like, in case of recording the "program B", it is necessary to press the record key at 21:00 and to press the stop key at 22:00. As shown in FIG. 3, now assuming that the record key is pressed with a delay time and the record key is pressed at, for example, 21:21 which is later than 21:00 and the stop key is pressed at 22:00, the program to be preserved becomes a program from 21:21 to 22:00 and the former half of the "program B" is lost.

On the other hand, since the management of the programs by the bookmark key 67 is executed on a unit basis of 30 minutes or one hour, even in such a case, the "program B" can be perfectly preserved.

Figure 4:
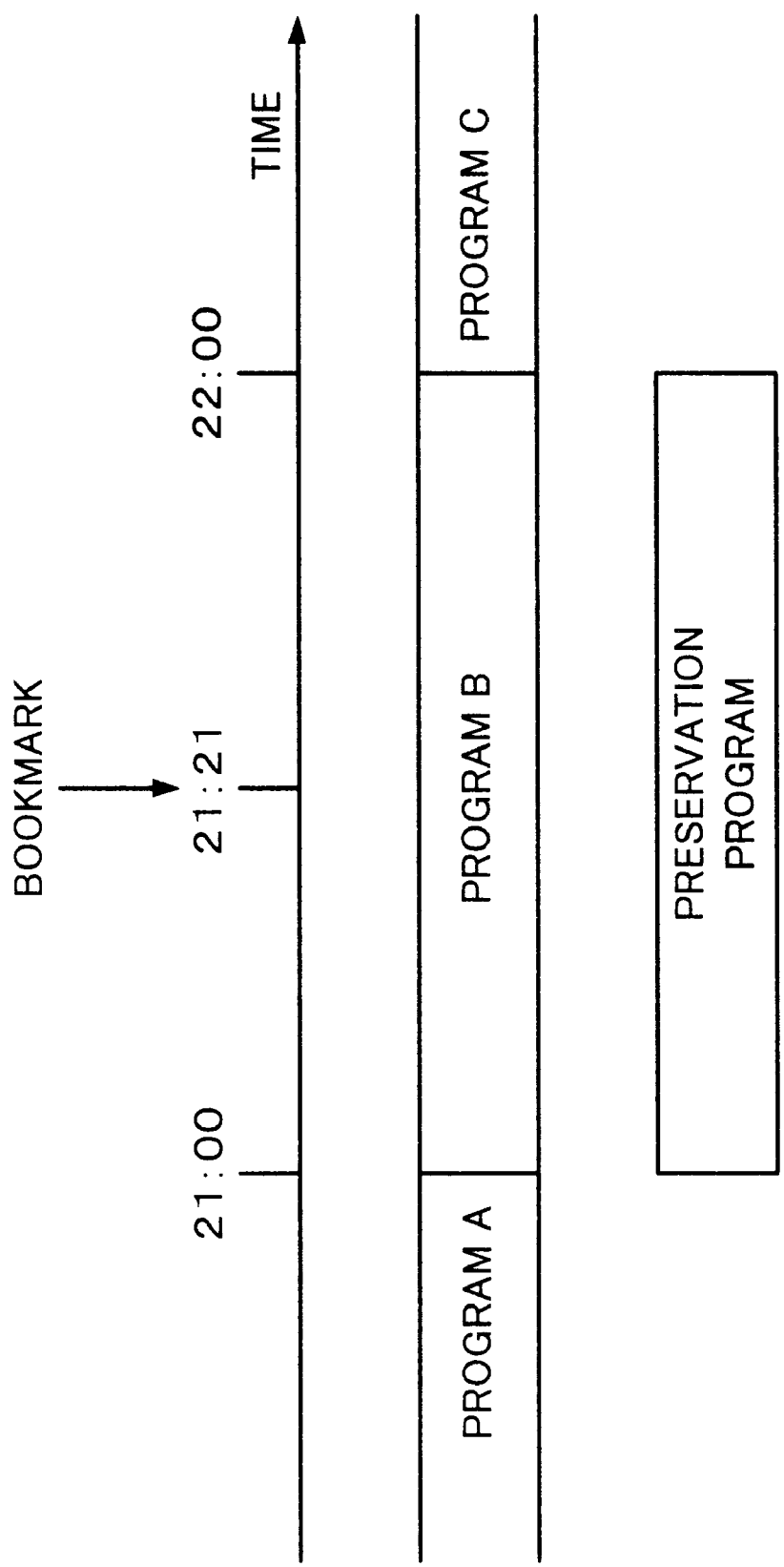
FIG. 4 is a schematic diagram for use in explanation of the program recording.

That is, as shown in FIG. 4, it is now assumed that the "program B" is broadcasted from 21:00 to 22:00 and this "program B" is recorded. In this case, the program of one hour from 21:00 to 22:00 is managed as one unit. Therefore, even if the bookmark key 67 is pressed at any time point so long as it lies within the period of time from 21:00 to 22:00, the "program B" corresponding to one unit is perfectly preserved. For example, it is now assumed that the bookmark key 67 is pressed at 21:21, this operation is regarded that the program from 21:00 to 22:00 is preserved, and the "program B" from 21:00 to 22:00 is preserved as shown in FIG. 4.

That is, in the past portion in the program recorded in the hard disk drive 30, in order to preserve the program from 21:00 to 21:21, the rewriting of the area of this portion in the hard disk drive 30 is inhibited. By using the remaining area in the hard disk drive 30, the remaining portion of the program from 21:21 to 22:00 is recorded. Thus, the "program B" from 21:00 to 22:00 is preserved. The "program B" can be preserved unless the area where such one program has been recorded is rewritten. Further, after passing 22:00, the program is always recorded by using the area. where the rewriting is not inhibited.

Moreover, since the channel, start time, and end time of the program preserved by using the bookmark key 67 have already been known, a reservation recording is set so that the same program can be recorded everyday or every week always or as necessary. The user can omit the operations for setting the channel, start time, and end time for the reservation recording.

As mentioned above, in the television receiver to which the invention is applied, the video signal which is being received is always recorded to the hard disk drive 30. For example, the video signal of 90 minutes is always accumulated in the hard disk drive 30. When the video signal over 90 minutes is accumulated, the old video signal is abandoned and the new video signal is written by ring-shaped addresses. Therefore, the program can be preserved while tracing back to the past before the bookmark key 67 is pressed.

It will be obviously understood that one unit of the program to be recorded can be set to one hour, 30 minutes, or 15 minutes. The unit time of the program to be recorded can be also changed.

Figure 5:
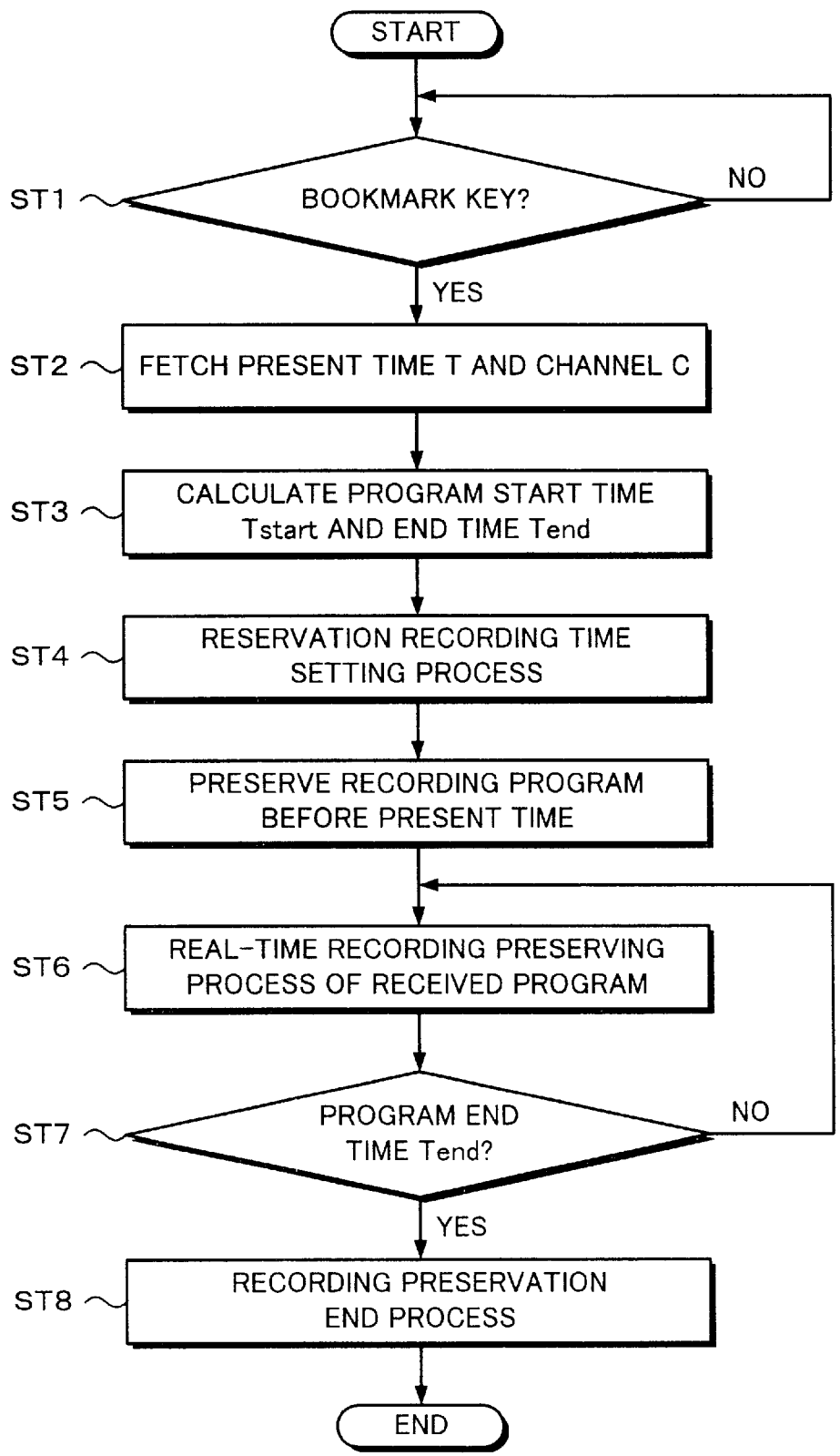
FIG. 5 is a flowchart for use in explanation of the program recording.

FIG. 5 is a flowchart showing a recording process of a program by such a bookmark key 67.

In FIG. 5, whether the bookmark key 67 has been pressed or not is discriminated (step ST1). When the bookmark key 67 is pressed, present time information T and channel information C are fetched (step ST2).

A recording start time $T_{start}$ and a recording end time $T_{end}$ are calculated from the present time information T (step ST3). For example, in the case where the program is managed on a hour unit basis, the recording start time $T_{start}$ becomes the time in which values of minutes and seconds of the present time T are set to "00". The recording end time $T_{end}$ becomes the time in which the hour of the present time T is moved up by one hour and the values of minutes and seconds are set to "00". For example, assuming that the present time T is 21:21, the recording start time $T_{start}$ is set to 21:00:00 and the recording end time $T_{end}$ is set to 22:00:00.

A reservation setting process is executed (step ST4). In the reservation setting process, a reservation start time $T_{start}$ and a reservation end time $T_{end}$ of a program to be preserved are set by pressing the bookmark key 67 by using a reserving mode of everyday or every week which has been preset in the apparatus and, further, a reservation channel C is set.

Subsequently, a preserving process of the program which was broadcasted before the present time is executed (step ST5). That is, for instance, the video signal of 90 minutes is always accumulated in the hard disk drive 30 by the ring-shaped addresses. In step ST7, in the video data preserved in the hard disk drive 30, the erasure of an area of the video data in a range from the recording start time $T_{start}$ to the present time is inhibited.

The preserving process of the broadcasting program which is being received is executed (step ST6). The preserving process of the broadcasting program which is being received inhibits the erasure of the area of the video data preserved in the hard disk drive 30 for such a period of time. While executing the preserving process of the broadcasting program which is being received as mentioned above, whether the end time $T_{end}$ has come or not is discriminated (step ST7). If the end time $T_{end}$ does not come yet, the processing routine is returned to step ST7 and such a preserving process of the broadcasting program which is being received is continued. When the end time $T_{end}$ comes, a recording preservation end process is executed (step ST8). The preservation of the program is finished.

Figure 6:
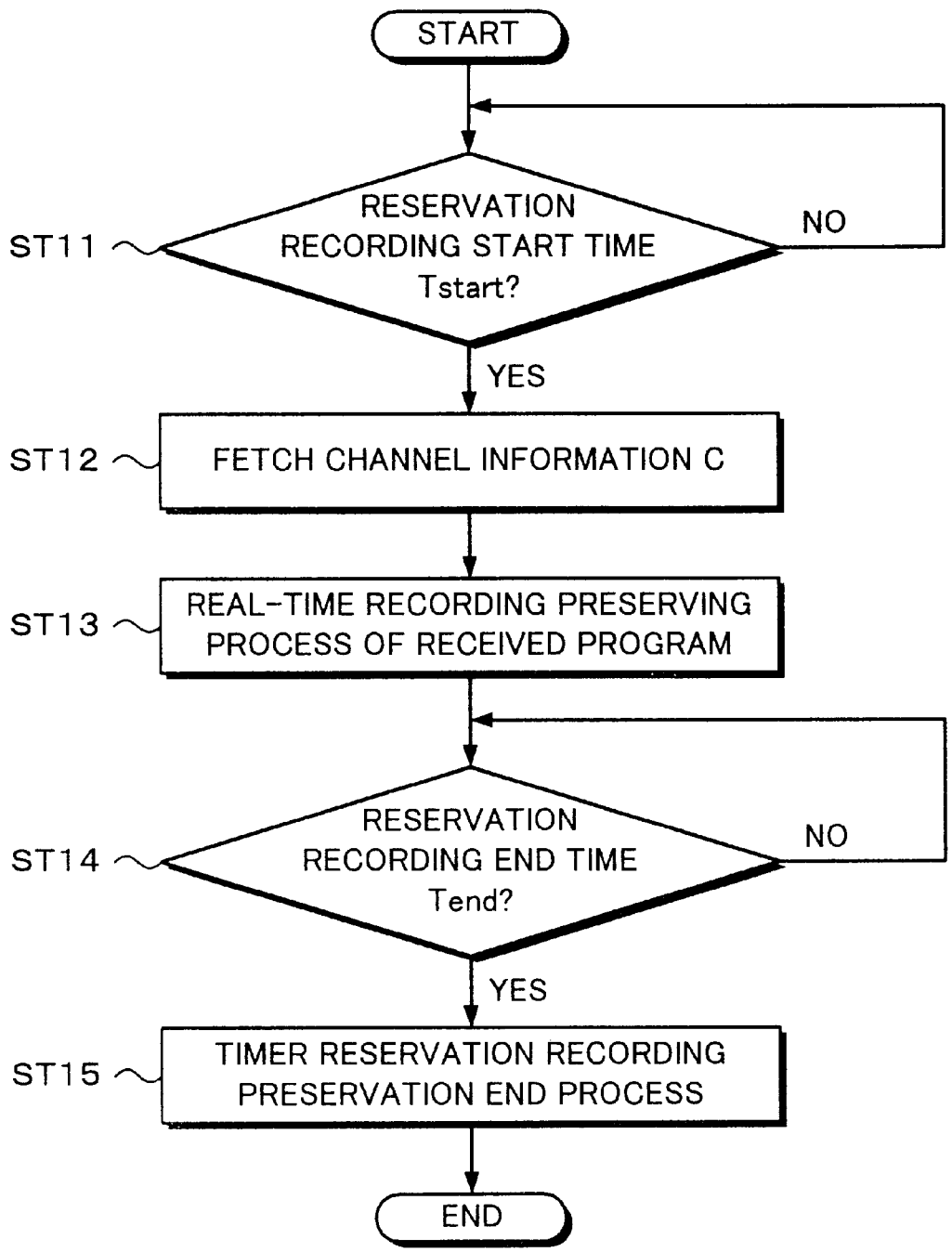
FIG. 6 is a flowchart for use in explanation of the program recording.

FIG. 6 is a flowchart showing a timer reservation recording process. As shown in the foregoing step ST4, when the program is preserved by depression of the bookmark key 67, a reservation recording mode is automatically set so as to record the preservation program everyday or every week. As described in step ST4, when the apparatus has been set to the reservation recording mode, the reservation start time $T_{start}$, reservation end time $T_{end}$, and reservation channel C have been set.

Whether the present time T has reached the reservation start time $T_{start}$ or not is discriminated (step ST11). When the present time T has reached the reservation start time $T_{start}$, a reception program process of the reservation channel C is performed (step ST12). Subsequently, a preserving process of the broadcasting program which is being received is performed (step ST13). The preserving process of the broadcasting program which is being received inhibits the erasure of the area of the video data preserved in the hard disk drive 30 for such a period of time. While performing the preserving process of the broadcasting program which is being received as mentioned above, whether the present time T has reached the reservation end time $T_{end}$ or not is discriminated (step ST14). If the reservation end time $T_{end}$ does not come yet, the processing routine is returned to step ST13 and the preserving process of the broadcasting program which is being received as mentioned above is continued. When the reservation end time $T_{end}$ comes, a recording preservation end process is executed (step ST15) and the preservation of the program is finished.

In the case where an EPG (Electronic Program Guide) can be received like a digital satellite broadcasting, since the present time and the reception channel are known, the program start time and the program end time can be accurately detected with reference to the EPG. Therefore, when the bookmark key is depressed, the program can be preserved in the hard disk while tracing back to the detected start time.

According to the invention, when the recording start of the program is inputted, the start time and the end time of the program are set on the assumption that the program is broadcasted from the start of the hour on a unit basis of 30 minutes or one hour. The received broadcasting is recorded for a period of time between the start time and the end time of the program which have been set as mentioned above. Therefore, by merely performing a simple key operation on the way of the program, the program can be certainly recorded from the start to the end.

What is claimed is:

1. A broadcast receiving apparatus, comprising:

a recording medium for always recording a video signal and an audio signal of a program that is received;

user input means for providing a command for program recording during the broadcast of said program;

calculating means for calculating a start time and an end time of said program based on the time of said command provided by said user input means, wherein said calculating means determines said start time by tracing back from the time when said command is provided to a predetermined time and said end time is determined on the basis of a program unit from said start time; and control means for preserving said program recorded in said recording medium between said start time and said end time.

2. The broadcast receiving apparatus according to claim 1, wherein said control means preserves said program by inhibiting a rewriting of a recorded area of said recording medium in a range corresponding from said start time to said end time.

3. The broadcast receiving apparatus according to claim 2, wherein said range of said recorded area is automatically set on the basis of said program unit.

4. The broadcast receiving apparatus according to claim 1, wherein said predetermined time corresponds back to the start of an hour in which said command is provided.

5. The broadcast receiving apparatus according to claim 1, wherein said program unit is set to an hour.

6. The broadcast receiving apparatus according to claim 1, wherein said program unit is set to 30 minutes.

7. The broadcast receiving apparatus according to claim 1, wherein said calculating means determines said start time and said end time by referring to an electronic program guide.

8. A broadcast receiving method comprising the steps of:

always recording a video signal and an audio signal of a program which is received, providing a command for program recording during the program broadcast, calculating a start time and an end time of said program based on a time of the provided command, wherein said start time is calculated by tracing back from the time when said command is provided to a predetermined time and said end time is determined on the basis of a program unit from said start time, and preserving said program recorded in said recording medium by inhibiting a rewriting of a recorded area of said recording medium in a range corresponding from said start time to said end time.

* * * * *